United States Patent [19]

Hofelt, Jr. et al.

[11] 3,724,137
[45] Apr. 3, 1973

[54] MEANS FOR CORRECTING NON-UNIFORMITY IN TIRES

[75] Inventors: Clarence Hofelt, Jr., Cuyahoga Falls; John E. Corl, Akron, both of Ohio

[73] Assignee: The General Tire & Rubber Company

[22] Filed: Feb. 27, 1970

[21] Appl. No.: 18,773

Related U.S. Application Data

[62] Division of Ser. No. 613,252, Feb. 1, 1967, abandoned.

[52] U.S. Cl. ................................................51/106 R
[51] Int. Cl. ....................................................B24b 5/00
[58] Field of Search ..51/106 R, 33 W, 105 R, 165 R, 51/165.71, 165.77, 165.9, 281, 289, 324, 326, 327; 73/146; 157/13

[56] References Cited

UNITED STATES PATENTS

| 3,574,973 | 4/1971 | Rader | 51/106 R |
|---|---|---|---|
| 2,079,585 | 5/1937 | Sloman | 73/146 |
| 2,695,520 | 11/1954 | Karsai | 73/146 |
| 2,731,887 | 1/1956 | Sjostrand | 90/11 |
| 2,765,845 | 10/1956 | Bullis | 157/13 |
| 2,766,563 | 10/1956 | Bennett | 51/33 X |
| 2,869,362 | 1/1959 | Gough et al. | 73/146 |
| 2,897,882 | 8/1959 | Barrett | 157/13 |
| 2,918,116 | 12/1959 | Mooney | 157/13 |
| 2,920,481 | 1/1960 | Hulswit et al. | 73/146 |
| 2,924,048 | 2/1960 | Sjostrand | 51/165 |
| 2,966,011 | 12/1960 | Peacock | 51/33 |
| 3,060,733 | 10/1962 | Herzegh | 73/146 |
| 3,375,714 | 4/1968 | Bottasso | 73/146 |
| 3,543,576 | 12/1970 | Bishop | 73/146 |
| 3,553,903 | 1/1971 | Christie | 51/106 R X |

*Primary Examiner*—Harold D. Whitehead
*Attorney*—Shlesinger, Arkwright & Garvey, Kemon, Palmer & Estabrook and Harry F. Pepper, Jr.

[57] ABSTRACT

Self-excited force variations in rolling pneumatic vehicle tires are a principal source of vehicle shake, roughness, and steering disturbances. These variations in a tire are measured by a tire uniformity machine after which the tire is subjected to a corrective action consisting of the removal of a small amount of tread material at the proper location.

21 Claims, 8 Drawing Figures

BIAS

RADIAL

WIDE OVAL

MEANS FOR CORRECTING NON-UNIFORMITY IN TIRES

This is a division of United States application Ser. No. 613,252, filed Feb. 1, 1967, entitled "Means for Correcting Non-uniformity in Tires", now abandoned.

BACKGROUND OF THE INVENTION

In the construction of pneumatic tires, it has been concluded by some that it is virtually impossible to build an absolutely uniform tire because of the many variables which enter in to tire construction. Some of these variables are, (1) dimensional irregularities such as those resulting from wear in the tire building machine, (2) changes in the characteristics of the calendered fabric such as the physical properties of the cord, variations in end count and non-uniformity in calendering, (3) the thickness, location, adhesion and amount of overlap of the various splices in the tire, (4) the large number of different compounds, materials and components which are employed in the manufacture of the tire, (5) human errors such as inaccurate centering of the tread and breakers and the use of uneven stitching pressures, and (6) variations in vulcanizing such as dimensional inaccuracy in the mold and non-uniform curing temperatures. All of these items, either singularly or through interactions with one another, give rise to deleterious effects such as, (1) stiffness variations, (2) eccentricity and non-concentricity, (3) gauge variations, (4) fluctuations in load forces, cornering force and rolling resistance force, (5) aligning torque and overturning moment variations, (6) offset of invariant lateral force from zero, and (7) tire static and dynamic unbalance; all of which contribute to tire vibrations and noise.

With the advent of our interstate network of super highways and the many features which are provided in todays vehicles for the comfort and safety of the driver and passengers at all speeds, many of these tire variations which heretofore have not been particularly troublesome are now becoming more noticeable to the consternation of the manufacturers of the vehicles and the tires that are used thereon.

Many methods have been used in an effort to correct specific tire irregularities. For example, a small amount of rubber can be added to the inside of a fabricated tire in an effort to balance the tire. On the other hand, it is relatively simple to balance a tire after it has been installed on the wheel by the addition of a small weight to the rim of the wheel to compensate for an unbalanced condition. Furthermore, it has been a common practice to "true" a tire by placing it in a lathe and grinding the tread to make it perfectly round. This is used to overcome a problem called radial runout, a term referring to the eccentricity of a tire. It has not been uncommon to check the free radial runout of a tire-wheel assembly and to remove from a vehicle those tires and wheels which show a large magnitude of radial runout.

None of these efforts have accomplished the purpose of producing a tire which is capable of giving a smooth ride at all speeds without regard to the nature or type of vehicle on which it is installed. In fact, in many instances the efforts of tire trueing and other "corrective" measures have served to aggravate the problem rather than solve it.

In recent years it has been found possible to measure, by relatively complex electrical means, the variations in a tire which are produced while the tire is being rotated against a surface and which are caused by the above-mentioned features of stiffness, force, torque and resistance fluctuations, offset and unbalance. The machines that have been developed to measure these variations are commonly referred to as uniformity machines and typically include means for mounting a tire on a rotatable axle, a drum attached to rotate freely, the axis of said drum being attached to appropriate strain gauges and means for measuring the forces exerted upon these strain gauges by the rotating tire. Signals produced by said forces are relayed to an appropriate read-out device such as an oscilloscope, oscillogram or a dial or meter. The strain gauges can be used, depending upon the way they are oriented with the axle of the drum, to measure either the radial forces (forces acting on the tire parallel to the wheel plane direction), lateral forces (those acting in the axial direction perpendicular to the wheel plane) or traction forces (those forces parallel to the wheel plane in the direction of motion of the tire). Furthermore, these strain or other force-measuring devices may be used to measure the various moments and invariant forces produced when the tire is rotated against the drum. Other transducers can be used to measure dimensional variations of the tire or to measure the torque required to rotate the tire.

With the aid of the tire uniformity machine, it has been found that there are several types of forces, force variations, moment variations, and dimensional variations occuring simultaneously during the rotation of an inflated tire under load against the surface. The forces include the normal tire load, the tire rolling resistance and, for some tires, an invariant lateral force sometimes known as conicity. The force variations include radial force variations, lateral force variations and tangential force variations, and the moment variations are aligning torque, overturning moment, and rolling resistance moment. It has been demonstrated that none of the preceding variations, with the exception of tangential force variations and balance, are dependent upon the speed of rotation, assuming that resonances are not present. However, as a practical matter, one or more of these forces may become a predominant factor at a given rotational speed, due to the establishment of resonance in the tire or in the tire-vehicle combination.

Tests with the various types of uniformity machines, as well as other types of tests, have revealed that the radial forces or radial force variations, those acting on the tire in the wheel-plane direction whereby the rotating tire is in contact with the road or test drum, constitute the major factor in the practical problem of tire uniformity and ride characteristics associated therewith. The radial forces are related to the dimensional variation and strength variation of the tire by the approximate formula:

$$F_{z_2} - F_{z_1} = k(r_2 - r_1) + \tfrac{1}{2} k(w_1 - w_2) + \tfrac{1}{4} k(\alpha_1 - \alpha_2)$$

Where: $F_z$ = radial force in pounds
$r$ = the free radial runout and represents an eccentricity, in inches
$w$ = the width of the tire, in inches
$a = (r-w)$, in inches
$sub_1$ = station 1 on the tire,
$sub_2$ = station 2 on the tire where the tire is moving from station 1 to station 2, and $k$ = a tire spring constant. In this formula $k(r_2 - r_1) + \frac{1}{2} k (w_1 - w_2)$ represents the contribution of dimensional changes of the tire and $\frac{1}{4} k (\alpha_1 - \alpha_2)$ represents the contribution of strength variations within the tire construction to the developed radial forces.

The effect of tire trueing is to eliminate the eccentricities of a tire, i.e., to reduce the term $k(r_2 - r_1)$ to zero. However, it can be seen that this does not have any effect upon $\frac{1}{2} k (w_1 - w_2)$ and will have only a slight effect upon $\frac{1}{4} k (\alpha_1 - \alpha_2)$ in the above equation for radial force variation. In some instances $F_z$ is reduced by tire trueing, thereby resulting in an increase in tire uniformity and a smoother riding tire. At other times, however, reducing the value of $r$ may have no effect on $F_z$ or may increase it. Furthermore, tire trueing results in the removal of an unnecessarily large amount of rubber from the entire tread surface of the tire.

The constantly changing value of $F_z$ around the entire circumference of a tire produces a pattern which is highly irregular and which will repeat itself each tire revolution unless the uniformity characteristics of the tire are altered in some manner. The radial force variation curve can be separated by mathematical techniques into first, second, third as well as a large number of higher order harmonics. The first and second harmonics are usually conceded to cause the vehicle ride disturbances known as shake which can be readily felt by the driver and passengers. At speeds of from 30 to 80 miles per hour, tires are revolving at 6 to 20 cycles per second. This frequency range will, depending upon individual cars, coincide with a vehicle resonance giving rise to a condition commonly known as wheel hop which occurs at 10 to 14 cycles per second in most cars. Also higher order harmonics may produce vibrations of about 40 cycles per second producing a noise which can be heard in the interior of the vehicle and which is commonly referred to as roughness. A special cause of roughness is known as thump which is a beat, the frequency of which matches the wheel rotational frequency. In addition, the force variations may be the cause of certain other effects sometimes referred to as boom or bong.

SUMMARY OF THE INVENTION

Although various types of tire uniformity machines have been built for analyzing the lateral and radial force variations produced by a tire when it rolls along a surface, no effective means have heretofore been available for correcting these variations. Instead, it has been necessary to downgrade the quality classification of those tires that were unable to meet various product specifications relating to tire uniformity.

It is an object of the present invention to provide a means for reducing the amount of the force variations in a pneumatic tire to an acceptable level.

Another object is a means for substantially compensating for these variations, particularly radial force variations, so as to produce a smooth-riding tire, even at high speeds.

Yet another object is to use the signal from a tire uniformity machine to automatically reduce the magnitude of radial force variations to an acceptable level.

A further object is to remove a small but finite amount of rubber from the tread area of a tire at the proper location to reduce the magnitude of a force variation.

DESCRIPTION OF THE PREFERRED EMBODIMENTS

Figure 1:
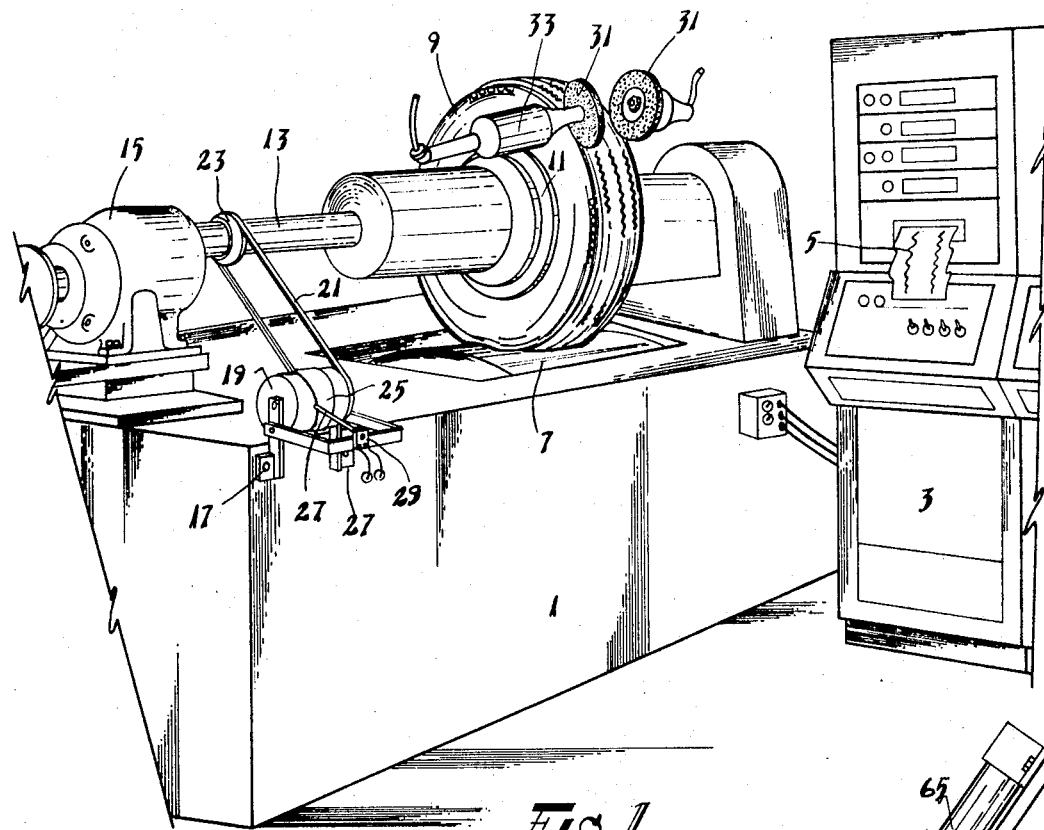
FIG. 1 is a perspective view of a tire uniformity machine, modified by the addition of a tire correction device thereto, various structural details omitted for clarity.

FIG. 1 shows the salient features of a typical tire uniformity machine comprising a housing 1 and including equipment for holding a tire and rotating the same against a test drum. The machine includes a control panel 3 containing various recording and sensing equipment, timers and an appropriate read-out device such as an oscillogram 5 upon which is recorded the results of the various measurements taken on the tire. The test mechanism comprises a test drum 7, essentially free wheeling about a stationary axle constrained by appropriate sensors (not shown) such as strain gauges. A tire 9 is mounted between a pair of rim halves 11 adapted to form an airtight seal with the tire beads and is then inflated to operating pressure. The rim halves are adapted to move toward or away from one another to permit the tire to be readily mounted and demounted. One rim half is engaged through a shaft 13 and a suitable speed reducer 15 to a motor (not shown) of either constant speed or preferably of the variable speed type, whereby the wheel can be rotated at a constant preselected speed. The rims 11 are preferably interchangeable so that tires having different bead diameters can be tested on the machine. In addition, an adapter (not shown) may be provided to permit tires to be tested while mounted on conventional automobile wheels. Means such as hydraulic cylinders are used to apply a predetermined initial radial load between the tire 9 and the drum 7 after which, for force variation measurements, a constant distance is maintained between the shaft 13, representing the axis of the tire and the test drum axis.

Mounted on the housing 1 between two brackets 17 is a small cylinder 19. This cylinder is adapted, by means of belt 21 and pulley 23, mounted upon shaft 13, to rotate at the same speed as the tire. Wrapped around the cylinder 19 is a tracing 25 made of cardboard or other suitable material. This tracing represents the distribution of the radial force variation curve as it appears on the oscillogram 5 obtained from the oscillograph and corresponds to one complete cycle thereof. Such a curve can be obtained by varying the speed of the oscillograph so that the length of the oscillogram during one revolution of the tire corresponds exactly with the circumference of the cylinder 19. The curve can then be reproduced on cardboard which is then cut out and wrapped around the cylinder. Means such as a spring loaded arm 27 are provided to follow the undulations of the curve on the cylinder 19 as the cycle rotates. An appropriate transducer 29 then feeds the signal thus produced into an appropriate control mechanism for a pair of grinding wheels 31. Because of the time interval between when a given portion of the tire contacts the test drum thereby transmitting an impulse to the sensing equipment and when that same portion of the tire reaches the grinding wheel, the tracing 25 on the cylinder 19 can be physically moved to provide a very simple means of delaying the action of the grinding wheel against the tire. As shown in FIG. 1, the two grinding wheels 31 and motors 33 are located at a position of about 150° from the footprint, i.e., the contact area between the tire and the drum. Thus, the cardboard tracing is physically shifted a like amount around the cylinder so that correction will occur at the location of the non-uniformity on the tire.

Figure 3:
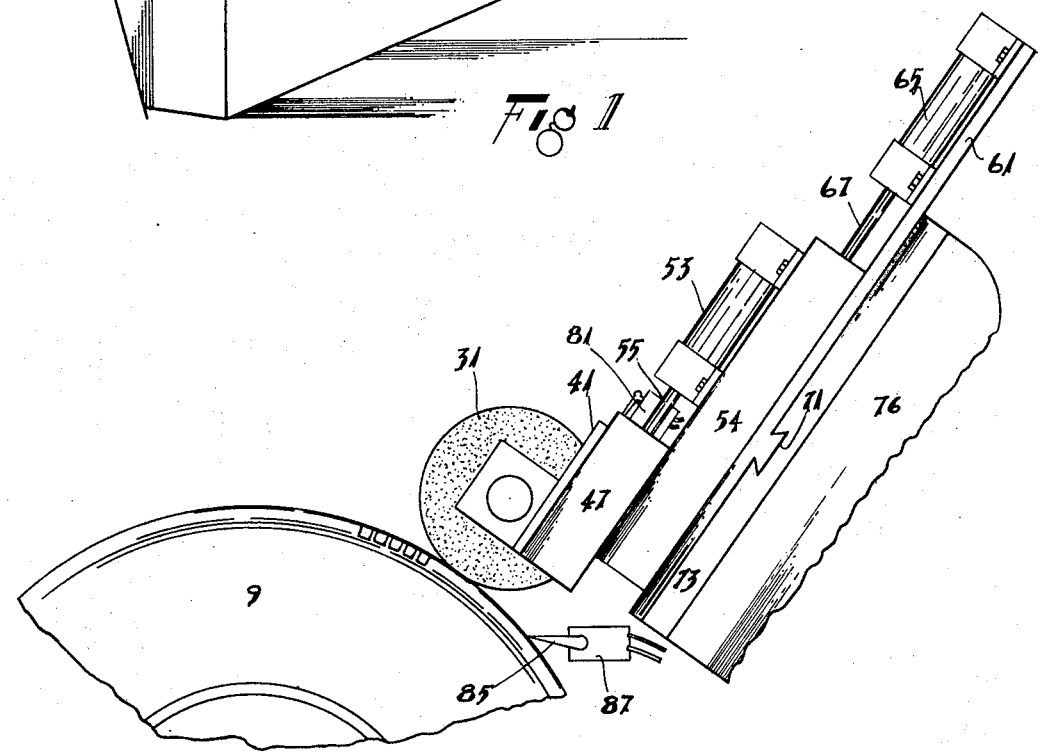
FIG. 3 is a side view of one of the grinding wheels shown in FIG. 2.
Figure 2:
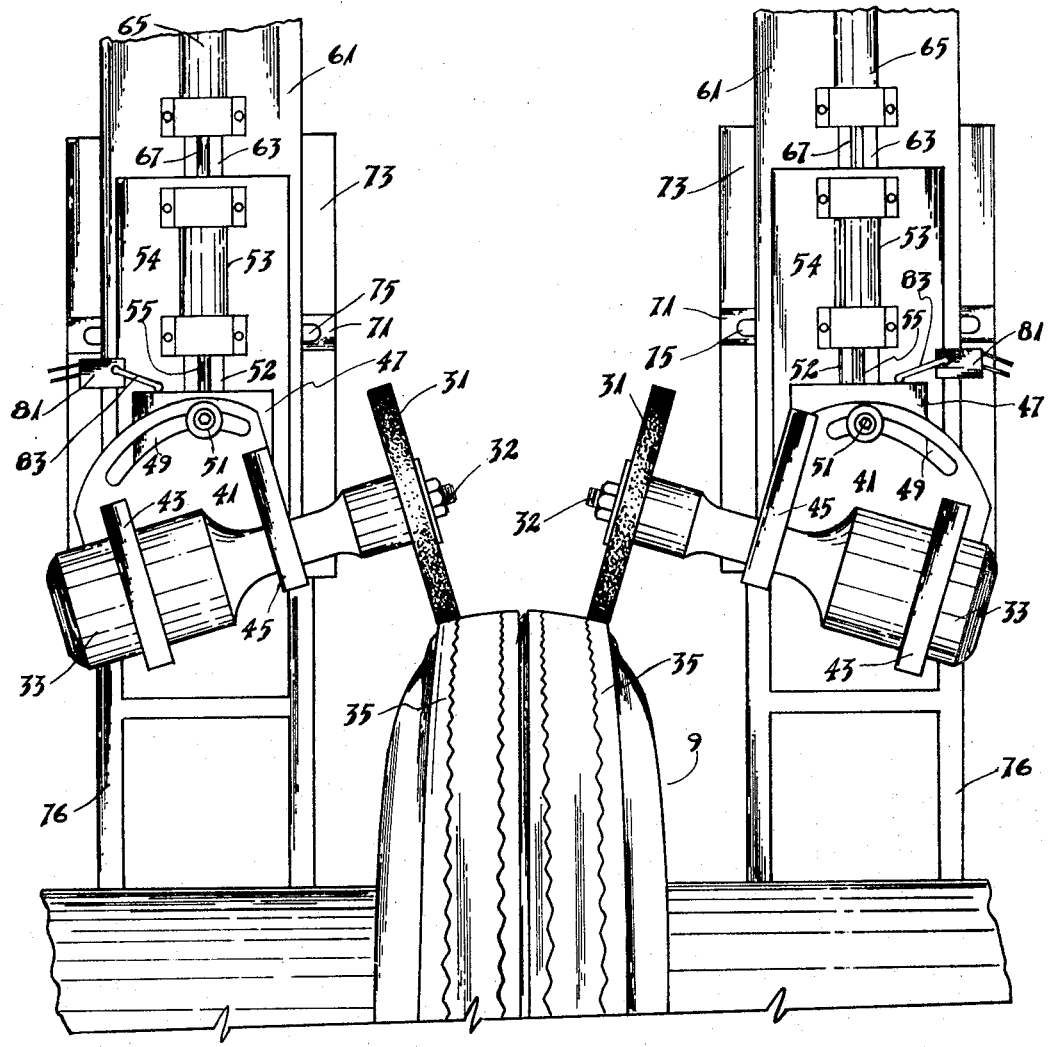
FIG. 2 is a partial plan view of the correction device showing a pair of grinding wheels in contact with a tire being corrected.

The principal operational features of the two grinding wheels are shown in FIGS. 2 and 3. FIG. 2 shows these two grinding wheels 31 bolted or otherwise secured to the shaft 32 of a suitable motor 33 such as an electric, hydraulic, or air-driven motor. Each of the grinding wheels is in contact with the outer rib 35 of the pneumatic tire 9, with the face of the wheel generally parallel with the rib. Each motor is secured to a mounting plate 41 by a pair of collars 43, 45. The mounting plate 41 is pivotally connected to a first moveable plate 47 and is provided with an appropriate means for adjusting the tilt angle of the grinding wheel, such as the curved slot 49 and securing means such as the bolt and washer 51. By loosening the bolt, it is possible to adjust the angle of each grinding wheel to conform to the contour of the tire.

The first moveable plate 47 is adapted to slide in a dovetail groove 52 of a second plate 54. Means such as hydraulic cylinder 53 mounted on plate 54 and piston rod 55, secured to plate 47, are used to slide said plate 47 in the groove 52. A laterally adjustable plate 61 contains a dovetail slot 63 on its top surface, adapted to contact the second moveable plate 54 and has a hydraulic cylinder 65 mounted thereon. A piston rod 67 interconnects the cylinder 65 with the plate 54 and serves to move this plate toward or away from the cylinder 65. The laterally adjustable plate 61 fits into a suitable groove 71 in base plate 73, said groove provided with a slot 75. Means such as a tapped hole in the back of plate 61, and a bolt threaded therethrough and engaging the slot 75, are used to maintain the laterally adjustable plate 61 in a fixed position. When this bolt is loosened, this plate 61 can slide along groove 71 to move the grinding wheels toward or away from one another to accommodate tires having narrower or wider treads or to permit removal of tread rubber at a location other than the outer rib. Base plate 73 is mounted on a suitable support member 76 which, in turn, is secured to the floor or the housing of the uniformity machine.

As seen in FIG. 3, a small finger 85 in contact with the tread area of the tire and connected to a transducer 87 or other sensing device is used to continuously measure the eccentricity or radial runout of the tire. The signal is fed from the transducer to an appropriate control mechanism (not shown) which in turn regulates the hydraulic cylinder 65 to maintain a fixed distance between the plate 54 and the tire irrespective of the diametric irregularities of the tire.

The radial force variation signal is measured by the uniformity machine and, through the use of cylinder 19, tracing 25, spring-loaded arm 27 and transducer 29 (FIG. 1), is used to control the pneumatic cylinder 53 to move each of the grinding wheels toward or away from the tire to effect the removal of rubber if necessary. The control mechanism (not shown) is typically of the hydraulic servo type with the electric input from transducer 29 providing the command signal. An error signal to the hydraulic servo system is provided by an additional transducer 81, similar to transducer 29 mounted so that the end of arm 83 presses on plate 47 and determines the distance plate 47 has moved. Thus, each grinder will be moved toward or away from the tire, the distance of the movement being commanded by transducer 29 and checked by transducer 81.

FIG. 5 shows the results obtained in applying the teachings of the present invention to three passenger tires of different construction; a bias ply tire, a radial ply tire and a wide oval tire. The following procedure was used for preparing and testing each of the three tires. The tire was mounted between two rims and was inflated with air to a pressure of 28 pounds per square inch. The tire was then placed against a cylindrical drum 30 inches in diameter, and a radial load of 1,280 pounds was applied thereto. After application of the load, the radial distance between the axis of the drum and the tire axis was locked in and held constant. An electric motor was used to drive the tire at a constant speed of 24 revolutions per minute against the drum at precisely zero camber and zero slip. Suitable transducers, which constrain the ends of the drum axle, were used to measure the radial load variations imposed upon the drum as the tire was rotated. The output from these transducers was first biased to zero to offset the applied load after which the radial force variations were amplified and were recorded on a suitable oscillogram. The speed of the graph was correlated with the speed of tire rotation so that the graph pattern for one cycle could be transferred to cardboard which was then wrapped around a small cylinder located near and adapted to rotate at the same speed as the tire. A spring loaded arm, following the curvatures of the pattern as the small cylinder was rotated, was used to control the movement of two grinders moving in concert at the tread of the tire. A transducer was located near the grinders in contact with the tire tread to insure that the grinders exactly followed the free radial runout of the tire and removed no rubber until so commanded by the radial force variation pattern wrapped around the small cylinder.

The grinding wheels were made out of steel with the cutting surface coated with a hard material such as tungsten carbide and were of the general type used to buff the white sidewalls of new tires. They were each powered by an air-drive motor having a maximum speed of 6,000 revolutions per minute. One grinder was positioned on each side of the tire in proximity of, and generally parallel with, the outermost tread rib on that side. They were located about 150° beyond the footprint or contact area between the tire and the drum. The cardboard graph on the cylinder was physically rotated the same amount to provide an elementary time delay mechanism.

Figure 5A:
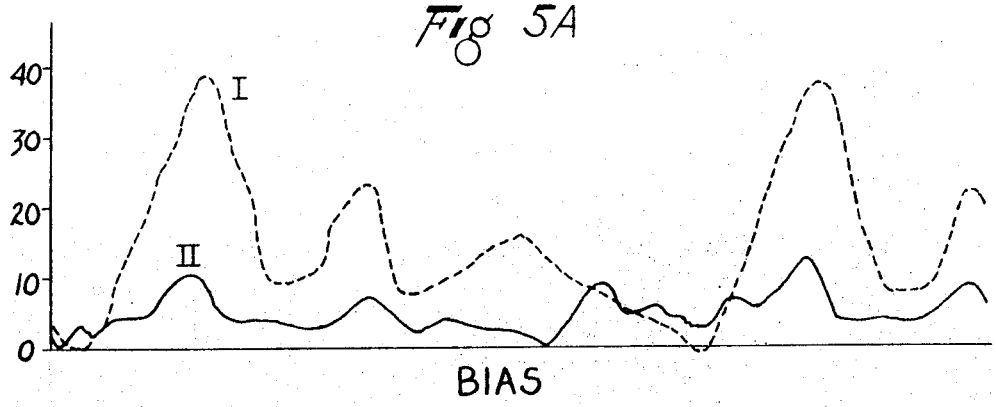
FIGS. 5A, 5B, and 5C are charts showing the radial force variation of three different types of passenger tires, before and after being corrected by the tire correction device of the present invention.
Figure 5B:
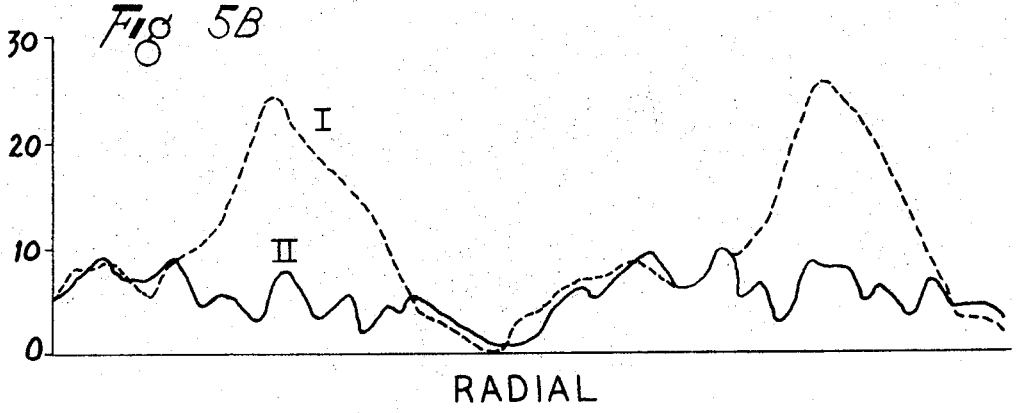
Figure 5C:
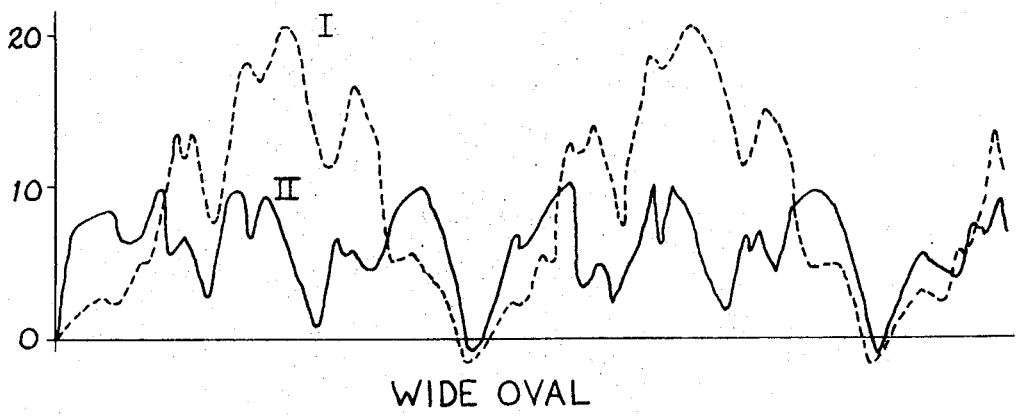

In the graphs of FIGS. 5A, 5B, and 5C, the dotted line represents the radial force variations of production line tires as manufactured and without correction, with the distance between the two high peaks representing one complete cycle or one revolution of the tire. In FIG. 5A is represented the radial force variation of a two-ply rayon tire having a cured cord angle at the crown of approximately 35° as measured from the circumferential plane of the tire, said tire containing no breakers. As seen on Curve I of FIG. 5A, the maximum variation is slightly less than 40 pounds. However, this value was reduced to approximately 8 pounds as seen in Curve II representing the radial force variation after the tire has been corrected by grinding. Curve I of FIG. 5B shows a maximum force variation of approximately 24 pounds for a two-ply radial tire having four circumferential breakers whereas after correction the variation was approximately 10 pounds (Curve II). The device was also used to reduce the maximum force variation on a wide-oval tire from a value of 21 pounds, as shown on Curve I OF FIG. 5C, to a value of about 10 pounds (Curve II). The wide-oval tire used for this test was a two-ply nylon passenger tire having no breakers and with a cured crown angle of 29°.

It should be noted that a series of separate steps were required to effect a substantial correction of these tires when using a cardboard tracing of the radial force curve from the uniformity machine to control the tire correction grinders. Each time the tire is partially corrected, this produces a new force variation pattern. The old pattern must then be removed from the cylinder and the new pattern placed thereon in order to provide a continual means of adjusting for the change in the characteristics of the tire as it is corrected. Thus, it was found necessary to repeat this operation several times before the radial force variations of the tires were reduced to an acceptable level. Even though several steps were required in the foregoing examples to reduce the radial force variation an appreciable amount, the total amount of rubber removed was so small that a quantative measurement is nearly impossible with ordinary equipment.

It should be noted that this correction is applied only to the outer ribs of the tire. If the entire tire had to be treated, too much rubber would be removed for practical application of this invention.

Figure 4:
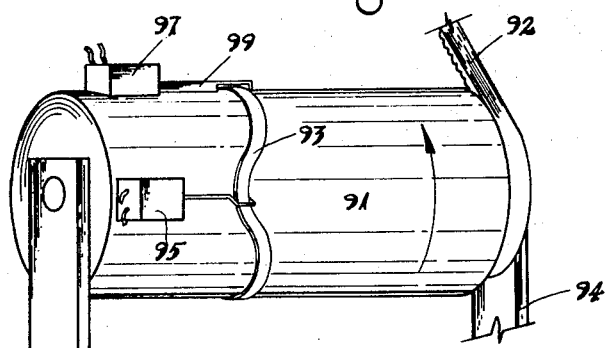
FIG. 4 shows a simple signal storage unit that can be used with the correction device of this invention.

Although several separate grinding steps were necessary, when using a cardboard tracing, to reduce the force variations to an acceptable level, it is obvious that other means could be used for accomplishing the same results on a continuous basis. FIG. 4 shows a somewhat equivalent method using a drum 91 similar to cylinder 19. A flexible guide or line 93, such as a flexible plastic strip or the fingers of a finger gauge, is located around the circumference of the drum. A servo mechanism 95, such as a hydraulic cylinder or an electric motor and cam arrangement, receives a command signal from the radial force variation pattern and pushes on the plastic material or finger gauge resulting in the radial force variation pattern being continuously reproduced around the drum surface. A transducer 97 and follower arm 99 is mounted to follow the pattern so formed and to provide the necessary time delay. The output from the transducer is used to control the grinding wheels in the same manner as previously described. The drum is mounted between brackets 94 and is rotationally driven by belt 92.

The same method may also be used to show the free radial runout pattern, either by use of a second flexible guide on the same drum or by using a separate drum. The radial runout may be measured at a location remote from the grinders and the test drum, so long as an appropriate time delay is provided. The outputs from the force variation transducer and the radial runout transducer may be electrically combined if desired to produce a singular control signal for the grinders.

Figure 6:
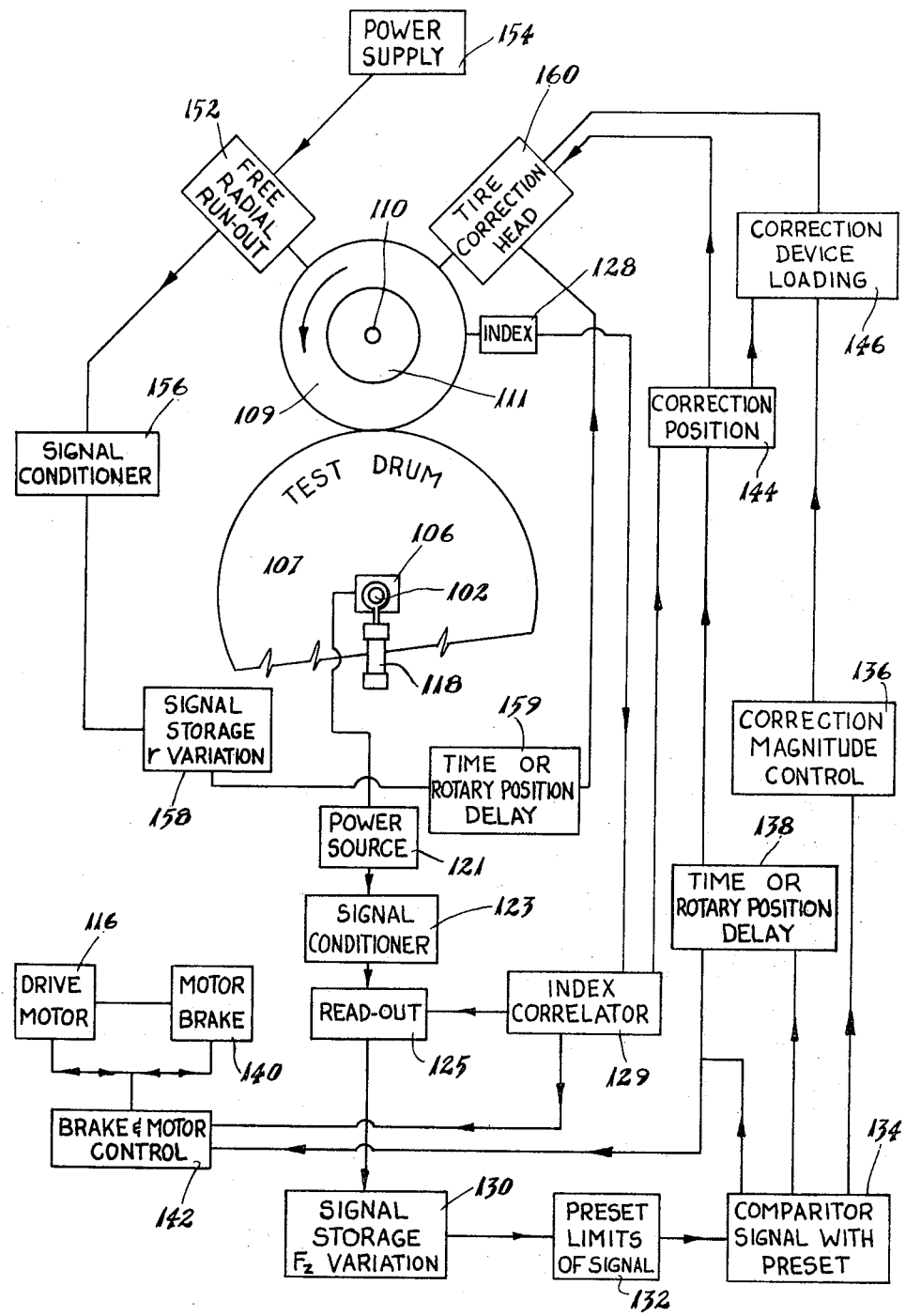
FIG. 6 is a schematic block diagram of the circuitry for a tire uniformity machine and the novel tire correction device.

FIG. 6 shows a schematic diagram of a typical tire uniformity machine modified according to the teachings of the invention by the addition of a tire correction device. The uniformity machine comprises a test drum 107 having a smooth circumferential surface and a diameter of between about 10 and about 67 inches mounted upon a non-rotating axle 102 attached to suitable sensors 106. A tire 109, typically a passenger tire, is mounted on a rim such as a solid or split rim 111 or an ordinary car wheel which in turn is engaged with an axle 110 driven by an appropriate motor 116. Means such as a pair of hydraulic cylinders 118, connected to the drum axle 102 axially outside of the sensors 106, are used to move the test drum 107 into contact with the tire and to apply a given load thereto.

The output from the sensors 106, which may be strain gauges with electrical flexures, is fed into a suitable power source 121 and then into a signal conditioner 123 after which it is fed to a suitable readout device 125, such as an oscillograph, a magnetic tape, a paper tape, a peak-to-peak indicator, or an appropriate computer entry format. The signal is preferably biased in a suitable manner in the conditioner to eliminate the effect of the radial static load applied to the tire and can then be conditioned so that the low point of the signal is established on an arbitrary zero line and the amplitude of the signal is increased to render the signal easily readable. An appropriate indexing device 128 such as a simple chalk line, a tape line, or a magnetic strip may be used to mark a reference point on the tire. This provides means for the index correlator 129 to explicity or implicity mark the readout device to provide means for correlating a point on the chart with the corresponding location on the tire.

Typically the machine is used with two sensored units, one connected to either side of the test drum. Each sensor unit includes elements to measure both the radial and lateral forces. Inasmuch, however, as radial force variations are accepted to be primarily responsible for the physical factors of shake and roughness, the following explanation of the operation of the means for correction will be explained with reference to $F_z$, the radial forces. The readout device 125 of the uniformity machine may, itself, serve as a signal storage unit or, alternatively, may feed the signal to a separate unit 130 such as a tape recorder, a magnetic disk, a long persistence oscilloscope screen, an oscillogram, or an analog to digital converter, the output of which can be fed into a memory device such as a tape recorder with the recording and playback heads spaced apart from one another, a computer memory circuit, a punch tape format, or a mechanical delay device. In any event, the signal must be retained for a sufficient length of time representing the movement of a specific location on the tire from the measurement location to the tire correction location. Angularly, this distance is usually assumed to be greater than 90° due to tread deformation which occurs as a given portion of the tire enters and leaves the drum contact area. Typically, the correction will occur between 90° and 270° after the footprint. This means that the signal must be stored for at least ¼ of a tire revolution before actuating the rubber removal means.

Depending upon the control standards and the desirability or undesirability of correcting all tires regardless of the magnitude of the non-uniformity, it is contemplated that a limit device 132 may be used to compare the magnitude of the force variations with given arbitrarily selected upper and lower limits. Thus, if the maximum variation is less than a given lower limit, no correction may be necessary. On the other hand, variations above a maximum limit may cause the tire to be automatically rejected. Comparator means 134, such as an appropriate computer or computer circuitry, a photo cell, magnetic tape or drum, or mechanical devices with an appropriate sweep mechanism can then be used to compare the output from the signal storage unit 130 with the limits of the preset signal device 132 to make this determination. The results of this comparison can be used on a commercial machine to actuate a set of relays which will automatically terminate the test, remove the load, deflate the tire and transfer it to a suitable conveying mechanism if the force variations are within an acceptable range or are too large to be easily corrected. However, if correction is desired, the comparator will permit those force variation signals which are of sufficient magnitude to require correction to emit a command signal to the correction magnitude control device 136 to remove some rubber on the tire. The control device 136 will regulate the loading device 146 which in turn will dictate the amount of rubber to be removed by the correction head 160. Delay mechanism 138 is used with the index correlator 129 to control a correction position device 144 which insures that the correction head removes rubber at the proper location. Special sensing devices such as linear resistors, air orifices or the like are used to indicate when the tire correction device contacts the tire and to show the magnitude of the correction. Suitable feed back is provided to insure continuous control of these various operations.

The delay mechanism 138 and index correlator 129 may be utilized to operate a control 142 for the motor 116 driving the tire axle and, optionally, a brake 140 which may be used to temporarily halt the rotation of the tire at the proper location during the tire correction period. On the other hand, tire correction can take place while the tire is rotating in which case no brake is necessary. The tire correction head 160 includes appropriate grinding, cutting or other means for removing a small amount of tread rubber from the tire at the location of the radial force variation.

An important factor in the successful operation of the present invention is the fact that the free radial runout of the tire at the point of correction is taken into account in determining the magnitude of correction. This is accomplished by the utilization of a displacement transducer 152 such as a linear potentiometer attached to a suitable power supply 154. The output from the transducer 152 is fed to a signal conditioner 156 and thence to a signal storage unit 158 and a time or position delay unit 159 whereupon it is fed to the tire correction head 160. In the tire correction head 160 the radial runout signal and the correction signal may be handled separately through the use of individual hydraulic cylinders or may be combined mechanically, electrically or pneumatically so that only one cylinder is required for each grinder.

As shown in FIG. 6, the transducer 152 used to measure free radial runout is positioned about 135° before the contact area between the tire 109 and the test drum 107, and the tire correction head is located about 135° past this area. The signal from the transducer 152 is fed to the signal storage unit and then to the delay unit 159 and is there held while the tire rotates about 270° at which time it is transmitted to the tire correction head to actuate, for instance, the cylinder 65 shown in FIGS. 2 and 3 to keep plate 54 at a fixed distance from the tread of the tire. The force variation signal produced at the tire footprint is retained by delay 138 for about 135° of revolution at which time it is relayed to the correction head to operate the hydraulic cylinder 53 to cause the grinding wheel to move into contact with the tread at the exact location of the force variation and to remove an amount of rubber from the tire corresponding to the magnitude of the force variation.

It should be noted that other features can be incorporated into the operation of this mechanism to improve the functioning thereof or to make it adaptable to a wide variety of tires. Grinding wheels of different coarseness may be used to polish the ground area as desired.

Although the preferred embodiments of this invention have been described, it is understood that there are many changes which can be made in the design and operation of this tire correction machine without deviating from the scope of the invention. For instance, it is apparent that the tire correction device does not have to be mounted on or physically associated with a tire uniformity machine. Instead, the force variation signals could be recorded and stored by computer memorization and later used to control a physically separate rubber removal means to correct the force variations. It is also apparent that the tire correction device could be used by measuring the dimensions of free radius and width and summing these in accordance with the equation previously mentioned to compute the force variation figures.

Rubber removal means, other than those described, can be used to correct the force variations. For example, rasps of the type used on a "Kraft/Nielson Buffer", or knives of the type used on a "Delugger Buffer" could be used. These buffers are both machines commercially used in tire retreading operations and sold by the Assignee of the present invention. Furthermore, disks or other removal means of the type commercially used in tire truing operations as mentioned previously may be used. (See for example, U.S. Pat. No. 2,765,845.) Furthermore, it is contemplated that rasps, knives, rotating disks or cones, or other removal means, may be used. As previously mentioned, it is not necessary that all of the rubber be removed from only the outer ribs. It is recognized, however, that the outer ribs of a tire carry a substantially greater load than do the inner ribs. Accordingly, corrective action is more effective when applied to these outer ribs. However, at least partial correction can be obtained by the removal of rubber from the shoulder of the tire or from the inner ribs as well as the outer ribs. Furthermore, rubber may be removed from only one of the two outer ribs to effect at least partial correction. Furthermore, it is possible to control each grinding wheel independently of the other; in which case, for example, the combination of elements schematically shown in FIG. 6 between the two sensors and grinding wheels could be duplicated and used between each sensor and each grinding wheel.

The physical means of providing an appropriate time delay, i.e., a cylinder and cardboard tracing, finger gauges or the like, can be replaced with equivalent electronic devices permitting the electrical signals to be recorded and stored and after an appropriate time delay, to operate the grinding wheels. This affords the advantage of continuously monitoring of the constantly changing force variation pattern produced by the gradual removal of rubber. As the force variation signal approaches zero, appropriate means can be employed to increase the signal strength to compensate for the lack of electrical or mechanical sensitivity of the tread removal mechanism.

Some of the functional steps and controls shown in FIG. 6 can be combined and others can be eliminated without adversely affecting the operation of the correction device. For example, the functions of signal storage and time delay can be handled simultaneously and with the same mechanism. The motor brake and brake control can be omitted, particularly if it is not necessary to halt rotation of the tire during correction. Also, the step of comparing the output signal with preset upper and lower limits can be omitted, particularly if it is decided that all tires are to be corrected, irrespective of the degree of non-uniformity. Furthermore, some of the other functions such as correction position, correction magnitude control and correction loading might be handled by other appropriate circuitry. Alternatively, the tires can be mounted manually on the uniformity machine or in the proper position for corrective action.

As stated previously, the radial force variation or "peak to peak" curve is mathematically separable into first, second, third, as well as a large number of higher order harmonics. Thus, instead of using this total or peak to peak curve to control rubber removal, such removal can be controlled by the first or a higher harmonic component of this curve.

These and other variations are possible without deviating from the scope of the present invention as defined by the following claims.

We claim:

1. The combination of a tire grinding machine and a control system therefor comprising means rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire, comprising:
   A. means for generating electrical signals representative of force variations around the circumference of a tire and including transducer means engaging the tire,
   B. a memory means for storing signals from the generating means and emitting an output signal in response to the information stored, and
   C. a servo mechanism for moving the grinding wheel means to and from a grinding position with respect to the tire in response to the output signal from the memory means.

2. The combination as claimed in claim 1 wherein the memory means is adapted to select and store the signal representative of the lowest force measurement taken during each revolution of the tire.

3. The combination as claimed in claim 2 including a means for correlating the transmission of a signal to the servo mechanism in response to the rotational position of the tire.

4. The combination as claimed in claim 3 wherein the correlating means comprises a delay means connecting the memory means and the servo mechanism to delay the transmission of the output signal from the memory means to the servo mechanism and a means for timing the operation of the delay means in response to the rotation of the tire.

5. The combination as claimed in claim 1 wherein separate force variation measuring means are mounted adjacent to each shoulder rib of the tire.

6. The combination of a tire grinding machine and a control system therefor comprising means rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire comprising:
   A. means for generating electrical signals in response to force variation measurements taken around the circumference of a tire,
   B. a memory means for selecting and storing the signals from the generating means, representative of the lowest force measurement during each revolution of tire,
   C. a comparator means for comparing the stored signal from the memory means with the varying signal from the signal generating means to provide an output grind signal when the stored signal and the varying signal differ by a predetermined amount, and
   D. a servo mechanism for moving the grinding wheel means to and from a grinding position with respect to the tire in response to the output grind signal from the comparator means.

7. The combination of a tire grinding machine and a control system therefor comprising means rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire, comprising:
   A. means for generating electrical signals representative of force variations around the circumference of a tire;
   B. a memory and comparator means for
      1. receiving signals from the generating means; and
      2. emitting an output grind signal in response to the information stored therein; and
   C. a servo mechanism for moving the grinding wheel to and from a grinding position with respect to the tire in response to the output grind signal from the memory and comparator means.

8. The combination as claimed in claim 7 including a delay means connecting the memory and comparator means and the servo mechanism to delay the transmission of the grind signal from the memory and comparator means to the servo mechanism and a means for timing the operation of the delay means in response to the rotation of the tire.

9. A device for improving pneumatic tires comprising
   A. means rotatably supporting an inflated tire having a peripheral tread with laterally spaced shoulder portions,
   B. surface means disposed adjacent to said tire so as to contact said tread,
   C. means to rotate said tire under load against said surface means,
   D. force sensing means operatively associated with said surface means for generating signals proportional to force variations generated by the tire during rotation of said tire under load against said surface means,
   E. rubber removal means mounted adjacent the tread of said tire adapted to move into and out of contact with said tread, and
   F. means to correlate signals from said force sensing means with circumferential locations on said tread and selectively control movement of said rubber removal means into and out of contact with said tread at at least one said circumferential locations.

10. The device according to claim 9 wherein the rubber removal means comprises at least one grinding wheel adapted to contact one of said laterally spaced shoulder portions of the tread of the tire.

11. The device according to claim 9 wherein said rubber removal means comprises a pair of grinding wheels, each of said wheels positioned to contact one of the laterally spaced shoulder portions of the tread.

12. A grinder control comprising:
   A. a force transducer to measure force variations around the circumference of a circular rotating resilient body in contact therewith and convert such force variations to electrical signals;
   B. means amplifying the signals;
   C. a memory means for selecting and storing the signal from the amplifying means representative of a predetermined relative force level of the force variations around the circumference of the body during each revolution of the body;
   D. a comparator means for comparing the stored signal from said memory means with a varying signal from the amplifying means to provide an output signal when the stored signal and the varying signal differ by a predetermined amount; and
   E. a servo mechanism for moving a grinding wheel to and from a grinding position with respect to the rotatable body in response to the output signal from the comparator means so that the grinding wheel may selectively grind off portions of the rotatable body and correct the force variations therearound.

13. A grinder control as claimed in claim 12 including a delay means connecting the memory means and the servo mechanism to delay the transmission of the grind signal from the memory means to the servo mechanism and a means for timing the operation of the delay circuit in response to the rotation of the body.

14. A device to reduce the magnitude of a given force variation which would be generated by an inflated pneumatic tire as it rotates under load along a surface, said device comprising
   A. means to drive a mounted and inflated tire having a tread portion about an axle and in contact with a test drum,
   B. means to apply and maintain a given load to the tire,
   C. means in connection with said test drum to measure force variations imposed against said drum by the rotating tire and adapted to produce a signal proportional to the magnitude of said given force variation,
   D. rubber removal means located in proximity of the tread of the tire,
   E. means to receive and store said signal until the tire has rotated sufficiently to bring that portion which imposed said given force variation against said drum to a position substantially opposite said rubber removal means,
   F. control means responsive to said signal to move said rubber removal means into contact with said tire when said portion is opposite thereto to remove a small amount of rubber from the tread.

15. The device according to claim 14 wherein the means in connection with said test drum to measure force variations imposed against said drum by the rotating tire and adapted to produce a signal proportional to the magnitude of said given force variation is adapted to measure force variations imposed radially of the test drum.

16. The combination of a tire grinding machine and a control system therefore comprising means rotatably supporting an inflated tire for rotation about its axis, grinding wheel means mounted adjacent the tire and movable into and out of contact with said tire to selectively grind off portions of the tire tread at various locations in response to force variation measurements taken around the circumference of the tire, comprising:
   A. means for generating electrical signals representative of force variations around the circumference of a tire;
   B. a memory and comparator means for
      1. receiving signals from the generating means; and
      2. emitting an output grind signal in response to the signals received; and
   C. a servo mechanism for moving the grinding wheel to and from a grinding position with respect to the tire in response to the output grind signal from the memory and comparatory means.

17. A grinder control comprising:
   A. a force transducer to measure force variations around the circumference of a circular rotating resilient body in operative contact therewith and convert such force variations to electrical signals;
   B. means amplifying the signals;
   C. a memory means for selecting and storing the signal from the amplifying means representative of a predetermined relative force level of the force variations around the circumference of the body during each revolution of the body;
   D. a comparator means for comparing the stored signal from said memory means with a varying signal from the amplifying means to provide an output signal when the stored signal and the varying signal differ by a predetermined amount; and
   E. a servo mechanism for moving a grinding wheel to and from a grinding position with respect to the rotatable body in response to the output signal from the comparator means so that the grinding wheel may selectively grind off portions of the rotatable body and correct the force variations therearound.

18. A grinder control as claimed in claim 17 including a delay means connecting the memory means and the servo mechanism to delay the transmission of the grind signal from the memory means to the servo mechanism and a means for timing the operation of the delay circuit in response to the rotation of the body.

19. A tire uniformity correction apparatus which includes means to rotatably support an inflated tire having a tread with lateral edge shoulders, means to radially load the tire tread and produce loaded rotation thereof, means to detect radial force variations in the tire tread occurring during the loaded rotation thereof which includes at least two load cells mounted to the means to radially load the tire tread, which detect radial load variations at least on both lateral edge shoulders of the tread, and produce electrical signals of said radial load variations, means to amplify the electrical signals produced by the load cells to produce amplified signals, means to determine and select grind signals from said amplified signals, grinder means positioned adjacent the tread of the tire, and means to actuate the grinder means to move the grinder means into the tread to grind portion from only the lateral shoulders in accordance with the grind signals as the tire rotates.

20. A tire uniformity correction apparatus according to claim 19 including means to shift the grind signals in accordance with the position of the load cells relative to the tire and the grinder means so that grinding takes place at the proper position on the tire, and where the grinder means comprises a pair of grinding wheels each positioned to engage only a respective lateral edge shoulder of the tire.

21. A tire uniformity correction apparatus which includes means to rotate an inflated pneumatic tire having a tread about its rotational axis, means to load the tire to effect rotation of the tire under loaded conditions, means to measure radial force variations in the tire relative to its rotational axis while it is rotating under loaded conditions and produce signals thereof and means to grind material off only the lateral edges of the tread of the tire while it is rotating under loaded conditions to correct such radial force variations to predetermined minimum acceptance levels.

* * * * *